(12) United States Patent
McCarty et al.

(10) Patent No.: US 8,152,132 B2
(45) Date of Patent: Apr. 10, 2012

(54) PNEUMATIC ACTUATOR HAVING DIAPHRAGM RETENTION RING

(75) Inventors: Michael W. McCarty, Marshalltown, IA (US); Ted D. Grabau, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 405 days.

(21) Appl. No.: 12/363,440

(22) Filed: Jan. 30, 2009

(65) Prior Publication Data

US 2010/0193716 A1 Aug. 5, 2010

(51) Int. Cl.
*F16K 31/00* (2006.01)
(52) U.S. Cl. .................. 251/61.4; 251/61; 251/331
(58) Field of Classification Search .............. 251/61, 251/61.2, 61.4, 331
See application file for complete search history.

(56) References Cited

U.S. PATENT DOCUMENTS

| | | | |
|---|---|---|---|
| 2,496,215 A | 1/1950 | Jones | |
| 2,947,319 A | 8/1960 | Kaldobsky | |
| 3,689,025 A | 9/1972 | Kiser | |
| 3,743,237 A | 7/1973 | Kiser | |
| 4,303,006 A | 12/1981 | Burke et al. | |
| 4,558,843 A | 12/1985 | Hoefelmayr | |
| 5,586,569 A | 12/1996 | Hanning et al. | |
| 6,019,121 A | 2/2000 | Uehara | |
| 6,102,071 A * | 8/2000 | Walton et al. | 137/540 |
| 6,719,268 B2 * | 4/2004 | Fukano et al. | 251/129.17 |
| 6,786,470 B2 * | 9/2004 | Newberg | 251/331 |
| 6,854,704 B1 * | 2/2005 | Young | 251/61.4 |
| 6,976,668 B2 * | 12/2005 | Weingarten | 251/331 |
| 7,028,986 B2 * | 4/2006 | Young | 251/291 |

FOREIGN PATENT DOCUMENTS

| | | |
|---|---|---|
| DE | 834 306 C | 3/1952 |
| EP | 0 166 528 A2 | 1/1986 |
| EP | 0 625 657 A1 | 11/1994 |
| GB | 323 413 A | 1/1930 |
| GB | 2 367 098 A | 3/2002 |

OTHER PUBLICATIONS

International Search Report for PCT/US2009/06976, mailed Apr. 1, 2010.
Written Opinion for PCT/US2009/069796, mailed Apr. 1, 2010.
IER Diaphragms web page printout. www.ierindustries.com/diaphragm.asp.

* cited by examiner

*Primary Examiner* — John Fristoe, Jr.
(74) *Attorney, Agent, or Firm* — Marshall, Gerstein & Borun LLP

(57) ABSTRACT

A pneumatic valve actuator for moving the valve stem of a control valve comprises an upper casing and a lower casing each having flanges, a diaphragm plate operatively coupled to the valve stem, a spring arranged to bias the diaphragm plate in a first direction, a diaphragm movable in conjunction movement of the diaphragm plate, an air inlet defined in the casing and arranged for attachment to an air supply source to bias the diaphragm plate in a second direction, and a ring disposed between the upper flange and the lower flange and positioned to engage the outer portion of the diaphragm. The ring includes a protrusion positioned to engage a surface of the outer portion of the diaphragm.

15 Claims, 4 Drawing Sheets

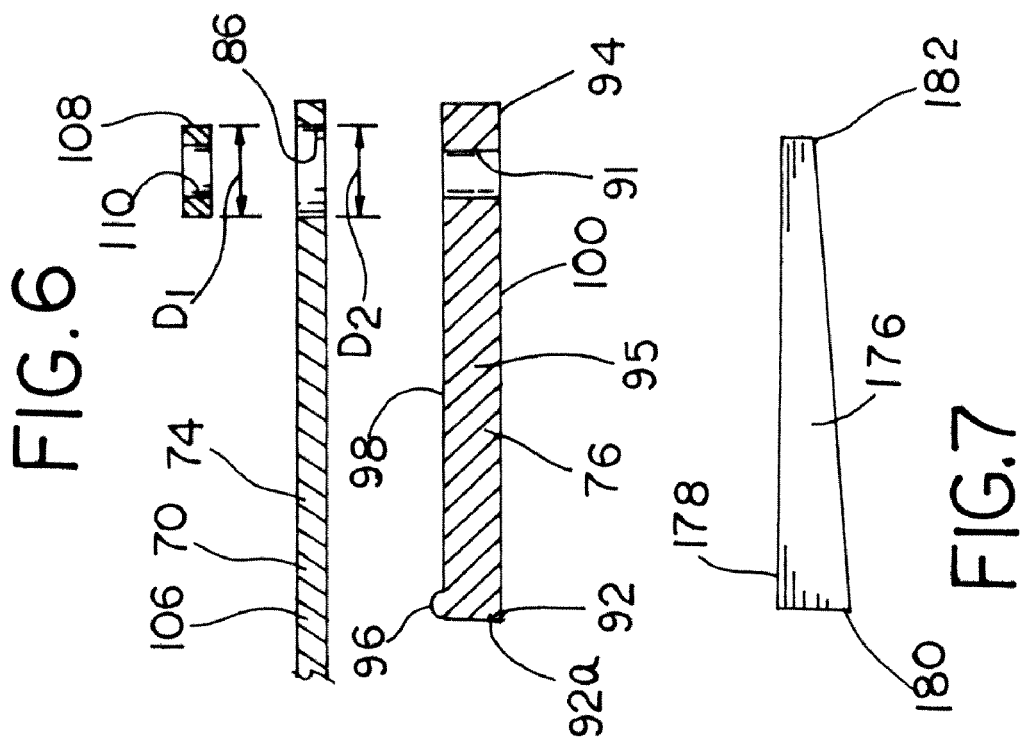
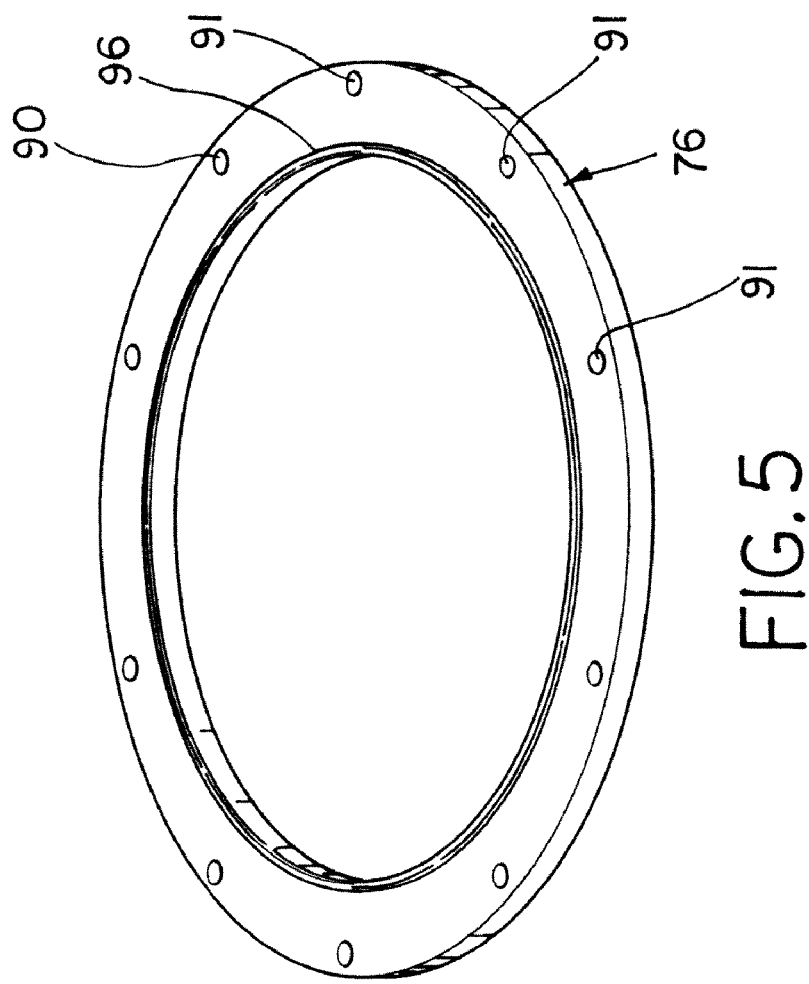

PNEUMATIC ACTUATOR HAVING DIAPHRAGM RETENTION RING

FIELD OF THE INVENTION

The present invention relates generally to valve actuators such as pneumatic valve actuators used on process control valves. More specifically, the present invention relates to a device and method for retaining the diaphragm within a pneumatic valve actuator.

BACKGROUND

It is generally known that process plants, such as refineries, chemical plants or pulp and paper plants, consist of numerous process control loops connected together to produce various consumer products. Each of these process control loops is designed to keep some important process variable such as pressure, flow, level, or temperature, within a required operating range to ensure the quality of the end product. Each of these loops receives and internally creates load disturbances that affect the process variable and control of the process control loops within the plant. To reduce the effect of these load disturbances, the process variables are detected by sensors or transmitters and communicated to a process controller. The process controller processes this information and provides changes or modifications to the process loop to get the process variable back to where it should be after the load disturbance occurs. The modifications typically occur by changing flow through some type of final control element such as a control valve. The control valve manipulates a flowing fluid, such as gas, steam, water, or a chemical compound, to compensate for the load disturbance and maintain the regulated process variable as close as possible to the desired control or set point.

It is generally understood that various control valve configurations may be specifically applicable for certain applications. For example, when a quick-opening valve with a narrow control range is suitable, a rotary control valve, such as a butterfly valve, may be used. Alternatively, when precise control over a large control range is required, a sliding stem control valve may be used. In any configuration, such control valves are generally coupled to a control device such as an actuator, which controls the exact opening amount of the control valve in response to a control signal. Thus, when designing a process, the process engineer must consider many design requirements and design constraints. For example, the design engineer must determine the style of valve used, the size of the valve, the type of actuator, etc.

In some systems, especially in pneumatically controlled fluid process systems, the actuator for any given fluid process control device may include a diaphragm actuator. Typical diaphragm actuators comprise a housing containing a spring-biased diaphragm assembly. The diaphragm assembly is operatively coupled to a flow control element via a valve stem or other actuator rod, in order to control the opening amount of the fluid process control device.

One known diaphragm assembly comprises a diaphragm and one or more diaphragm plates. The diaphragm comprises a flexible disk-shaped member constructed of a fluid-tight fabric, polymer, or other suitable material. The plates are disposed adjacent to the diaphragm and are adapted to be engaged by one or more springs disposed within the housing. Additionally, the plates provide a rigid mechanical connection to the stem. The springs serve to bias the diaphragm assembly into a predetermined position such that the actuator may bias the control device into an open or closed configuration.

In each of these known diaphragm assemblies, it is also necessary to secure the outer portion of the diaphragm to the outer portion of the actuator housing. Preferably, the outer portion of the diaphragm is secured in a manner that minimizes the chances of diaphragm failure, and in a manner that simplifies assembly.

BRIEF DESCRIPTION OF THE DRAWINGS

FIG. 5 is a perspective view of an exemplary retention ring.

FIG. 6 is an enlarged fragmentary exploded view illustrating a portion of the retention ring, the diaphragm, and an insert.

FIG. 7 is an enlarged fragmentary exploded view illustrating a portion of a retention ring assembled in accordance with another disclosed example of the present invention.

DETAILED DESCRIPTION OF THE PREFERRED EMBODIMENTS

Although the following text sets forth a detailed description of an exemplary embodiment of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Based upon reading this disclosure, those of skill in the act may be able to implement one or more alternative embodiments, using either current technology or technology developed after the filing date of this patent. Such additional indictments would still fall within the scope of the claims defining the invention.

Figure 1:
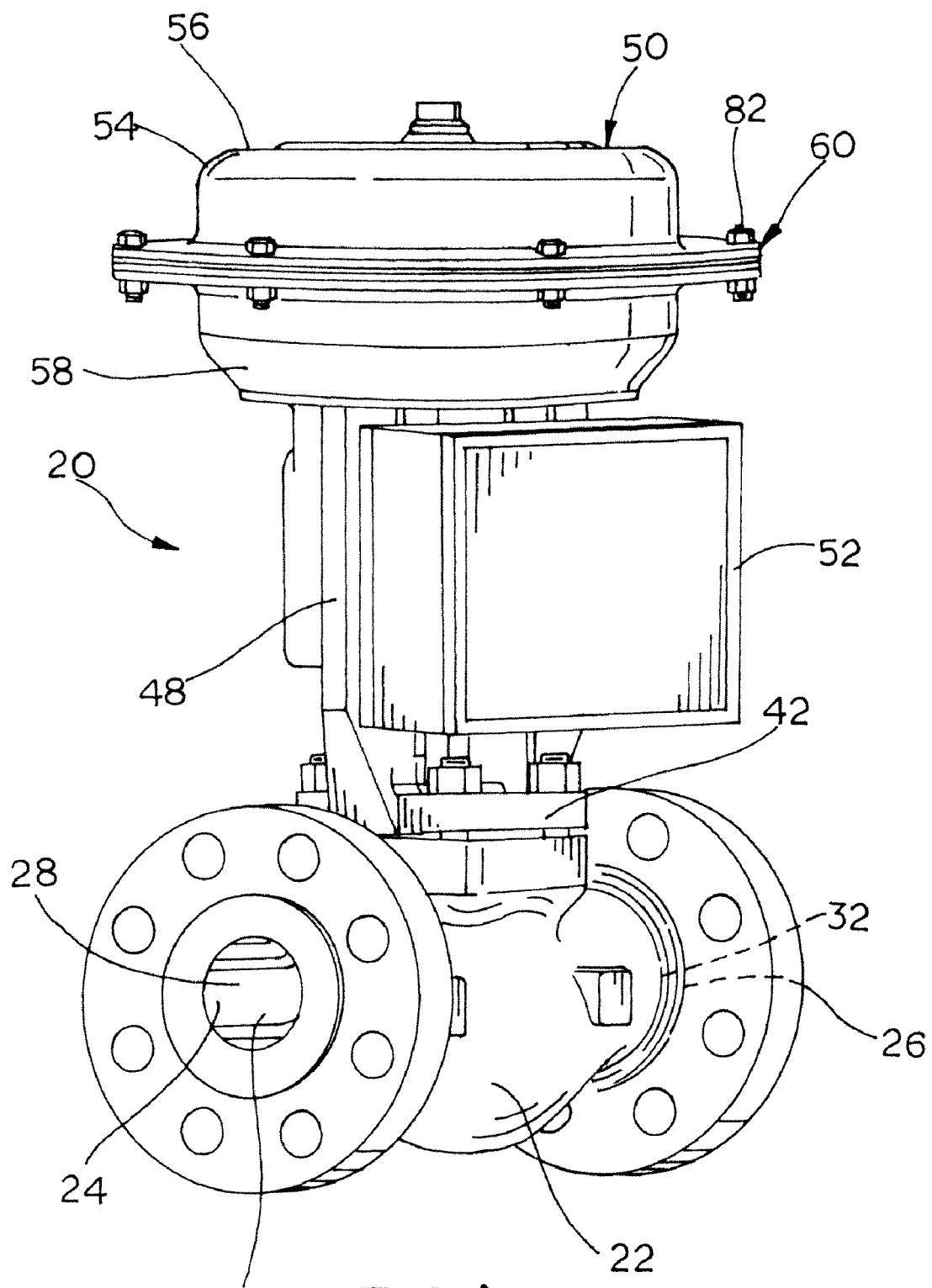
FIG. 1 is a perspective view of an exemplary control valve having a pneumatic actuator and assembled in accordance with the teachings of the present invention.
Figure 2:
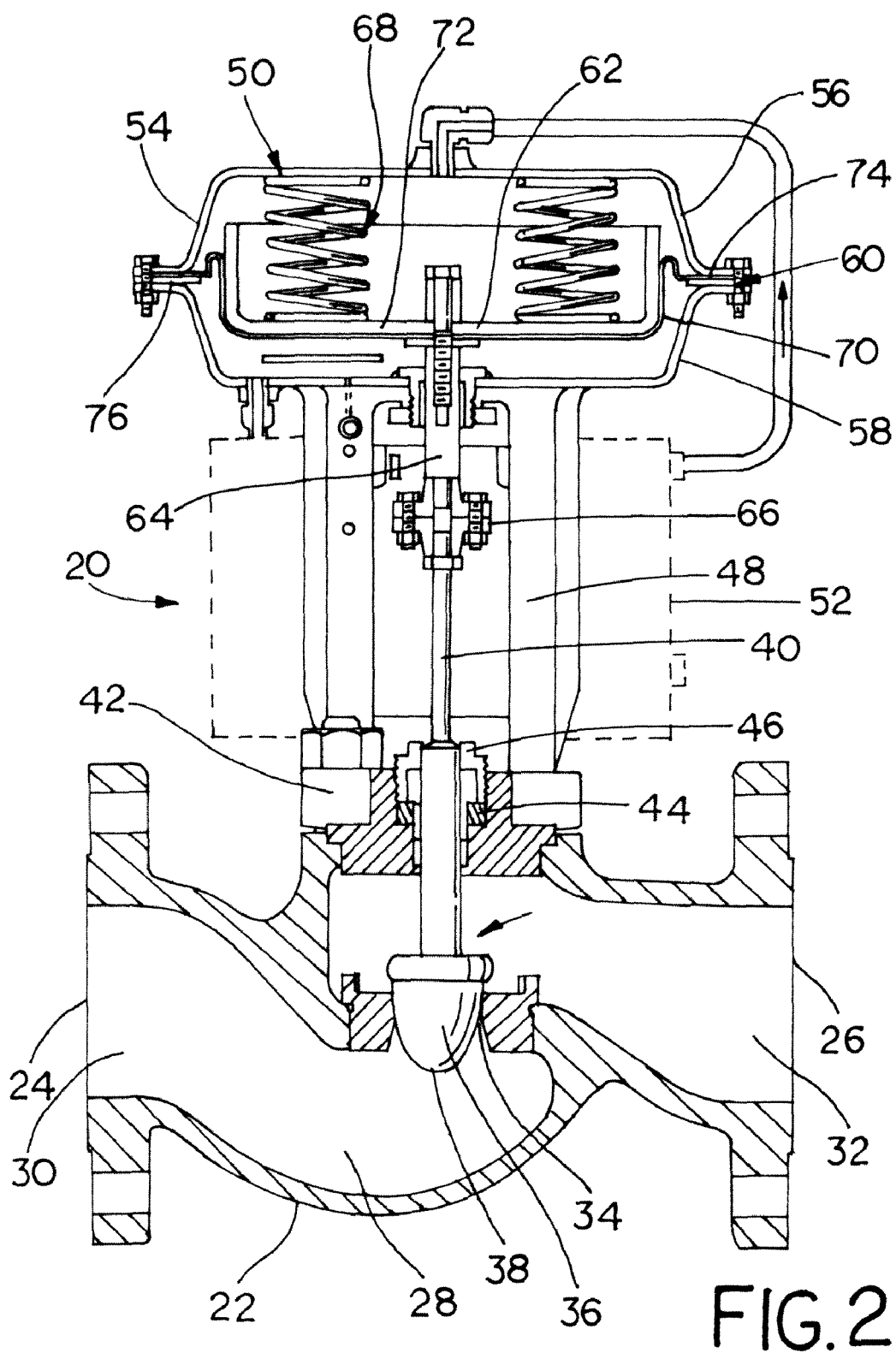
FIG. 2 is a cross-sectional view of the control valve of FIG. 1 and illustrating a diaphragm and retention ring assembly assembled in accordance with a disclosed example of the present invention.

Referring now to the drawings, FIGS. 1 and 2 show a control valve 20 of the type commonly employed in process control systems. The control valve 20 includes a valve body 22, a valve inlet 24, a valve outlet 26, and a flow passage 28 that extends between the inlet 24 and the outlet 26. The flow passage 28 includes an inlet passage 30, an outlet passage 32, and a control passage 34.

As shown in FIG. 2, the control valve 20 includes a moveable control component 36 which, in the disclosed example, takes the form of a valve plug 38. The valve plug 38 is connected to a valve stem 40, and the valve plug 38 and the valve stem 40 are sized and positioned such that the valve plug is disposed in the control passage 34. The control component 36 may take the form of, by way of example rather than limitation, a valve sleeve, a valve disc, or any other type of control component commonly employed in the field of control valves. Further, the valve stem 40 may be a sliding stem, a rotary stem, or any other form of moveable or shiftable valve stem. The control valve 20 also includes a bonnet 42 having a packing box 44 having a packing nut 46, a yoke 48, an actuator 50 connected to the yoke 48, and may include a valve positioner 52. The illustrated actuator 50 is a pneumatic actuator, which may be suitably connected to the valve positioner 52 or to any other mechanism for controlling the actuator. The actuator 50 includes a diaphragm casing 54 having an upper portion 56 and a lower portion 58, which are joined together along a circumferential joint 60.

Referring still to FIG. 2, the actuator 50 also includes an internal diaphragm plate 62 that is suitably connected to an output shaft 64, and the output shaft 64 in turn is connected to the valve stem 40 using a suitable coupling 66. A suitable biasing assembly 68 is disposed within the actuator 50. In the illustrated example, the biasing assembly 68 bears against a top portion of the diaphragm plate 62, and also bears against an inside or bottom surface of the top portion 56 of the diaphragm casing 54. In the disclosed example, the biasing assembly is a plurality of springs. The actuator also includes a flexible diaphragm 70, which bears against a central portion 72 of the diaphragm plate 62. The diaphragm includes an outer portion 74, which is sized to extend radially outward so as to be disposed at the joint 60 between the upper portion 56 and the lower portion 58 of the diaphragm casing 54. As shown in FIG. 2 (and explained in greater detail below), a retention ring 76 assembled in accordance with the teachings of a disclosed example of the present invention is disposed within the diaphragm casing 54 along the joint 60. In response to operation of the positioner 52, the pressure changes within the diaphragm casing 54, which in turn moves the diaphragm 70 and the diaphragm plate 62 up and down within the diaphragm casing 54. This up and down movement changes the position of the control component 36 in order to control the flow of a process fluid through the control valve 20.

Figure 4:
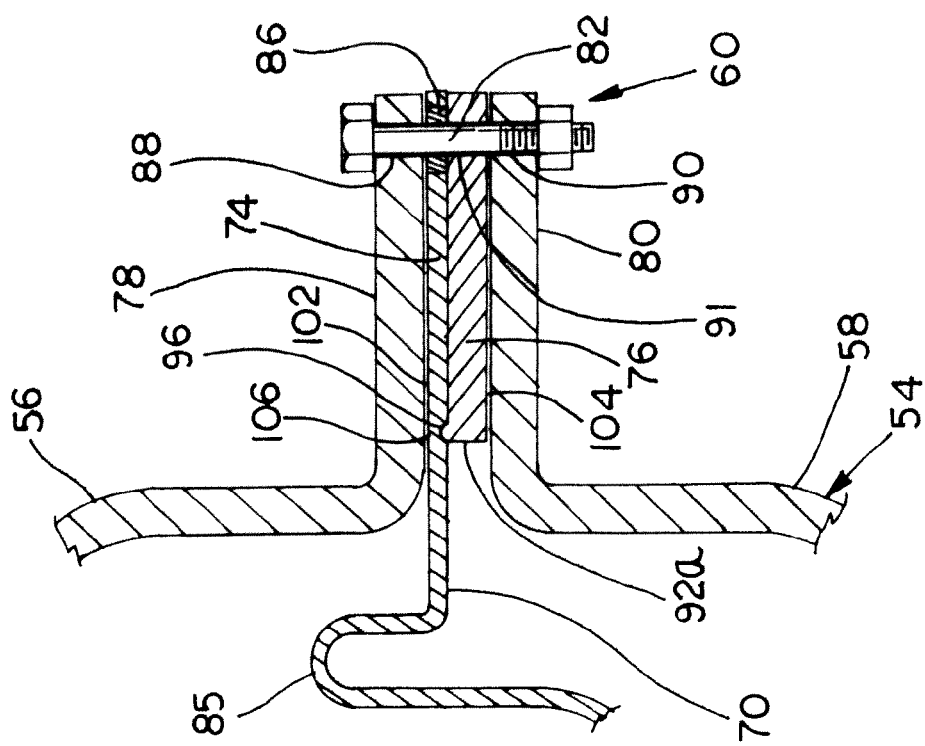
FIG. 4 is a further and large fragmentary cross-sectional view similar to FIG. 3.
Figure 3:
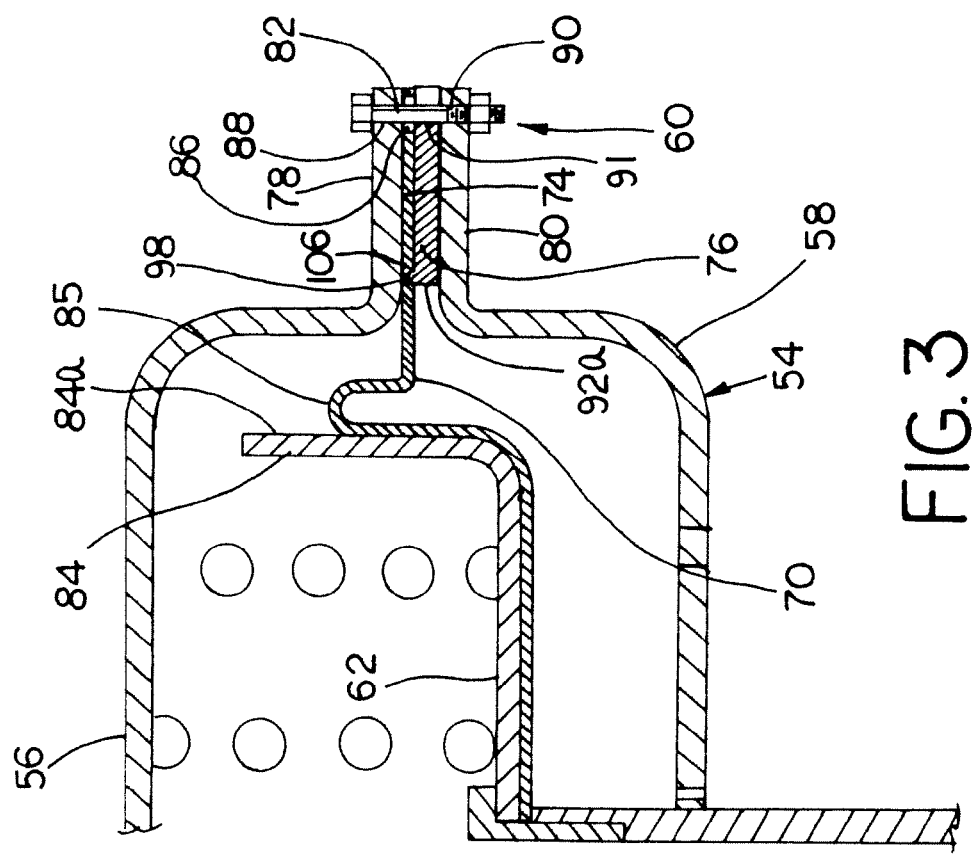
FIG. 3 is an enlarged fragmentary cross-sectional view taken through the right hand side of the pneumatic actuator shown in FIG. 2 and illustrating aspects of the retention ring.

Referring now to FIGS. 3 and 4, the upper portion 56 and the lower portion 58 of the diaphragm casing 54 are shown in greater detail, as are the outer portion 74 of the diaphragm 70 and the retention ring 76. The upper portion 56 and the lower portion 58 of the diaphragm casing 54 each include an outer flange 78 and 80, respectively, and the outer flanges 78 and 80 are connected together by a plurality of attachment bolts 82 to form the joint 60. The diaphragm plate 62 (FIG. 3) includes an upwardly extending portion 84 having a surface 84a. The diaphragm 70 includes a convolution 85, such that a portion of the diaphragm 70 rolls against the surface 84a as the diaphragm plate 62 moves up and down. As outlined above, the outer portion 74 of the diaphragm 70 extends between the outer flange 78 and the outer flange 80. Preferably, the diaphragm 70 includes a plurality of attachment holes 86 (which are shown more clearly in FIG. 6) which are sized to receive a corresponding one of the attachment bolts 82 and which may be positioned to register with a selected one of a plurality of attachment holes 88 in the outer flange 78 and attachment holes 90 in the outer flange 80. The retention ring 76 is sized for placement between the outer flange 78 and the outer flange 80, and the retention ring 76 also includes a plurality of attachment holes 91 which register with the attachment holes 86 and 88, as well as with the attachment holes 86 on the outer portion 74 of the diaphragm 70. Accordingly, the flanges 78, 80, the outer portion 74 of the diaphragm 70, the retention ring 76, and the attachment bolts 82 together form the joint 60.

Referring to FIGS. 5 and 6, the retention ring 76 includes an inner portion 92 and an outer portion 94, with the attachment holes 91 preferably formed generally adjacent the outer portion 94. The retention ring 76 also includes a protrusion 96. Preferably, the protrusion 96 is formed generally adjacent the inner portion 92 of the retention ring 76. In the disclosed example, the protrusion 96 is formed at an innermost end 92a of the retention ring 76 when viewing the retention ring 76 in cross-section as shown in FIGS. 3, 4 and 6. The retention ring 76 includes an upper surface 98 and a lower surface 100. Accordingly, when the retention ring 76 is positioned as shown in the disclosed example as illustrated in FIGS. 3 and 4, the upper surface 98 is positioned adjacent a lower surface 102 of the outer portion 74 of the diaphragm 70. The lower surface 100 is positioned adjacent in upper surface 104 of the outer flange 80. Consequently, in the disclosed example, the outer portion 74 of the diaphragm 70 is positioned between the upper surface 98 of the retention ring 76 and the lower surface of the outer flange 78. When positioned as shown, the protrusion 96 extends upwardly from the upper surface 98 of the retention ring so as to engage and compress an adjacent portion 106 of the diaphragm 70 from below. It will be appreciated that the retention ring may also be positioned above the outer portion 74 of the diaphragm 70 such that the protrusion 96 extends downwardly into an upwardly facing surface of the diaphragm 70, thus engaging the retention diaphragm 70 from above.

Referring now to FIGS. 3, 4 and 6, the protrusion 96 is shown in cross-section. In accordance with the disclosed example, the cross-section of the protrusion 96 is curved or generally semicircular. Other shapes for the cross-section may prove suitable. In accordance with the disclosed example, the protrusion 96 is integrally formed with the balance of the retention ring 76 out of a single piece of material. Consequently, in the example shown, the protrusion 96 is formed by a thickened lip 104. Alternatively, the protrusion 96 may be formed from a separate and distinct component, such as a separate ring that is glued, welded, bonded or otherwise suitably secured to the balance of retention ring 76. Further, although the protrusion 96 is shown adjacent the inner portion 92, the protrusion also may be formed in a central portion 95 of the retention ring 76, or adjacent the outer portion 94.

As best shown in FIGS. 4 and 6, the hole 86 preferably is sized to receive an insert 108. In the example shown, the hole 86 is larger than the hole 91. The insert has an outer diameter D1 sized to match a diameter D2 of the hole 86, and has an inner bore 110 sized to receive the attachment bolt 82. In accordance with the disclosed example, the insert 108 spreads out loads experienced at an interface between the diaphragm 70 and the bolts 82, and avoids stress risers in the diaphragm 70.

As shown in FIG. 7, an alternative embodiment for the retention ring is shown and is referred to by the reference numeral 176. As shown in FIG. 7, the retention ring 176 includes a thickened portion 178. As shown, the thickened portion 178 is disposed adjacent an inner end 180 of the retention ring 176, such that the inner end 180 is thicker than an outer end 182. Alternatively, the thickened portion 178 may be spaced at the inner end 180 or slightly away from the inner end 180. As shown, the retention ring 176 may have a slightly wedge-shaped cross-section in which an inner end 180 is thicker than the outer end 182.

The control valve 20 incorporating any one of the above-described retention rings 76, 176 may be assembled from a conventional valve as follows. After sizing the outer flanges 78 and 80, including the location of the attachment holes 88 and 90, the diaphragm 70 may be chosen from conventional materials and may be sized based on conventional sizing principles. The diaphragm, 70 will be provided with the attachment holes 91, which are sized and located to register with the attachment holes 88 and 90 and to receive the bolts 82. The holes 86 preferably will be sized to receive the inserts 108.

The retention ring 76 is provided with the annular ring-shaped protrusion sized to fit between the upper flange and the lower flange, and the diaphragm is positioned between the upper flange and the lower flange, and positioning the protrusion such that the bears against an adjacent surface of an outer portion of the diaphragm. The flanges are then secured together.

Preferably, the annular ring-shaped protrusion may be formed on a ring sized to fit between the upper flange and the lower flange and is provided with attachment holes through an outer portion of the ring, with each attachment hole sized to receive a fastener. The ring is aligned or positioned such that the attachment holes are aligned with holes in the upper and lower flanges, and spacers or inserts are inserted in the attachment holes between the flanges. The ring-shaped protrusion may be formed adjacent an inner portion of the ring, an outer portion of the ring, or adjacent a central portion of the ring. The protrusion may have a curved cross-section, and may be formed by providing a thickened portion adjacent an inner portion of the ring or adjacent any other suitable portion of the ring. The ring-shaped protrusion may be formed by shaping a selected one of the upper flange or the lower flange to have an angled cross-section, such that an inner portion of the selected flange has a first thickness and an outer portion of the selected flange has a second thickness less than the first thickness.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the present disclosure may be varied without departing from the spirit of the invention, and the exclusive use of all modifications which are within the scope of the claims is reserved.

The invention claimed is:

1. A pneumatic valve actuator for moving a valve stem of a control valve, the actuator comprising:
    a diaphragm casing comprising an upper casing and a lower casing;
    the upper casing having an upper flange and the lower casing having a lower flange;
    a diaphragm plate movably disposed between the upper casing and the lower casing, the diaphragm plate arranged to be operatively coupled to the valve stem to move the valve stem;
    a spring disposed between the upper casing and the lower casing and arranged to bias the diaphragm plate in a first direction;
    a diaphragm disposed between the upper casing and the lower casing, the diaphragm including a central portion movable in conjunction with movement of the diaphragm plate;
    the diaphragm including an outer portion sized to fit between the upper flange and the lower flange;
    an air inlet defined in the diaphragm casing and arranged for attachment to an air supply source, the air inlet permitting the air supply source to bias the diaphragm plate in a second direction;
    a retention ring disposed between the upper flange and the lower flange and positioned to engage the outer portion of the diaphragm, wherein the upper flange and the lower flange have attachment holes each sized to receive a fastener, and wherein the ring includes an outer portion having holes alignable with the attachment holes; and
    the retention ring including a protrusion positioned to engage a surface of the outer portion of the diaphragm.

2. The valve actuator of claim 1, including an insert sized for placement in each of the holes of the outer portion of the ring, each of the inserts sized to receive one of the fasteners.

3. The valve actuator of claim 1, wherein the ring includes an inner portion, and wherein the protrusion is formed adjacent the inner portion.

4. The valve actuator of claim 1, wherein the protrusion includes a curved cross-section.

5. The valve actuator of claim 1, wherein the protrusion is formed by providing a thickened portion adjacent an inner portion of the ring.

6. The valve actuator of claim 1, wherein the ring includes a wedge-shaped cross-section, wherein an inner portion of the ring has a first thickness and an outer portion of the ring has a second thickness less than the first thickness.

7. The valve actuator of claim 1, wherein the protrusion comprises a lip.

8. The pneumatic valve actuator of claim 1, and including an insert sized for placement between the upper flange and the lower flange in alignment with each of the attachment holes, each of the inserts sized to receive one of the fasteners.

9. The valve actuator of claim 1, wherein the upper and lower flanges define complementary opposing planar mating surfaces extending radially outwardly from the upper and lower casings, wherein the protrusion is disposed between the complementary upper and lower mating surfaces.

10. The valve actuator of claim 9, wherein the opposing mating surfaces are planar from the casings to an outer peripheral edge of the flanges.

11. A method of improving retention of a diaphragm within a pneumatic valve actuator for a control valve, the pneumatic valve actuator including a movable diaphragm plate coupled to a valve stem, a spring operatively coupled to the diaphragm plate, and a diaphragm having a central portion movable in conjunction movement of the diaphragm plate and an attachment hole, the method comprising:
    sizing an upper flange and a lower flange of an actuator casing, the actuator casing housing the diaphragm plate and the diaphragm;
    providing an annular ring-shaped protrusion sized to fit between the upper flange and the lower flange and forming the ring shaped protrusion on a ring sized to fit between the upper flange and the lower flange;
    providing attachment holes through an outer portion of the ring, each attachment hole sized to receive a fastener;
    positioning the diaphragm and attachment hole between the upper flange and the lower flange;
    positioning the ring such that the attachment holes are aligned with holes in the upper and lower flanges;
    positioning the ring-shaped protrusion between the upper flange and the lower flange such that the ring-shaped protrusion bears against a surface of an outer portion of the diaphragm;
    inserting spacers in the attachment holes and between the flanges; and
    securing the upper and lower flanges together with a fastener disposed through the attachment hole.

12. The method of claim 11, including forming the ring-shaped protrusion adjacent an inner portion of the ring.

13. The method of claim 11, including shaping the ring-shaped protrusion to have a curved cross-section.

14. The method of claim 11, including forming the ring-shaped protrusion by providing a thickened portion adjacent an inner portion of the ring.

15. The method of claim 11, including forming the ring-shaped protrusion by shaping a selected one of the upper flange or the lower flange to have an angled cross-section, such that an inner portion of the selected flange has a first thickness and an outer portion of the selected flange has a second thickness less than the first thickness.

* * * * *

UNITED STATES PATENT AND TRADEMARK OFFICE
CERTIFICATE OF CORRECTION

PATENT NO. : 8,152,132 B2
APPLICATION NO. : 12/363440
DATED : April 10, 2012
INVENTOR(S) : Michael W. McCarty et al.

Page 1 of 1

It is certified that error appears in the above-identified patent and that said Letters Patent is hereby corrected as shown below:

In the Claims:

Claim 11, Column 6, line 52, "and attachment" should be -- and the attachment --.

Signed and Sealed this
Twenty-seventh Day of August, 2013

Teresa Stanek Rea
*Acting Director of the United States Patent and Trademark Office*